March 14, 1944. A. G. STEINMAYER 2,344,006
METHOD OF MAKING ELECTROMAGNETIC INDUCTION APPARATUS
Filed Jan. 25, 1941 2 Sheets-Sheet 1
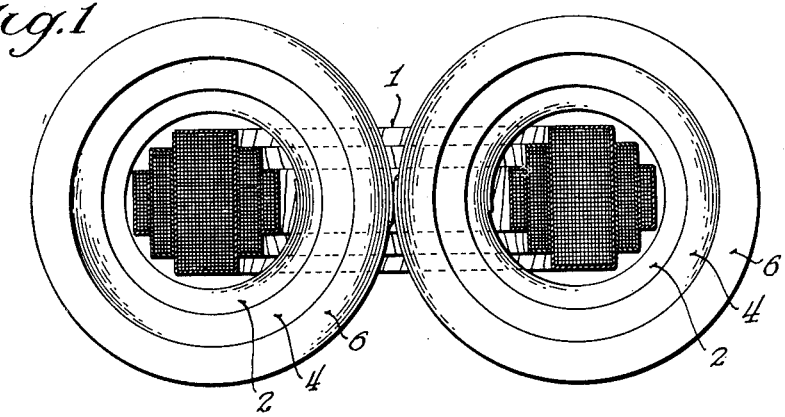
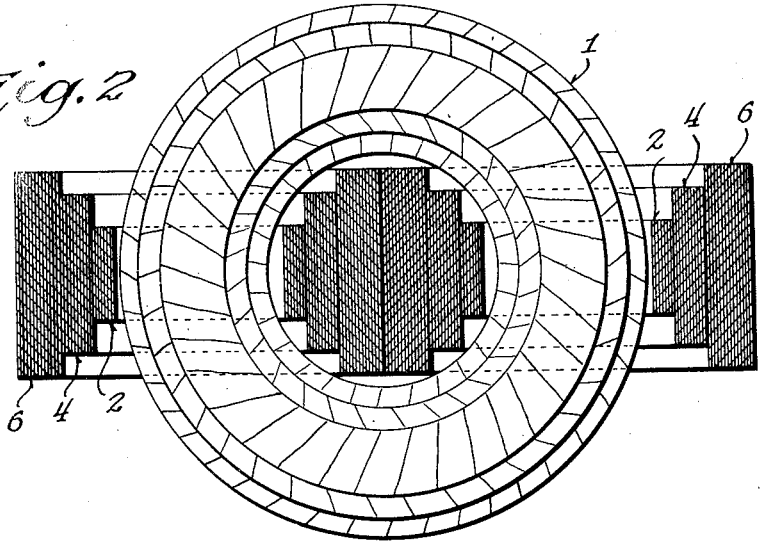
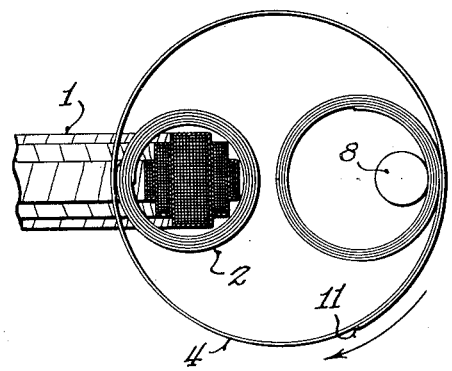
INVENTOR.
ALWIN G. STEINMAYER
BY
ATTORNEY.

March 14, 1944. A. G. STEINMAYER 2,344,006
METHOD OF MAKING ELECTROMAGNETIC INDUCTION APPARATUS
Filed Jan. 25, 1941 2 Sheets-Sheet 2
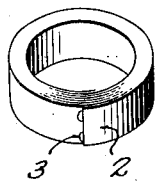
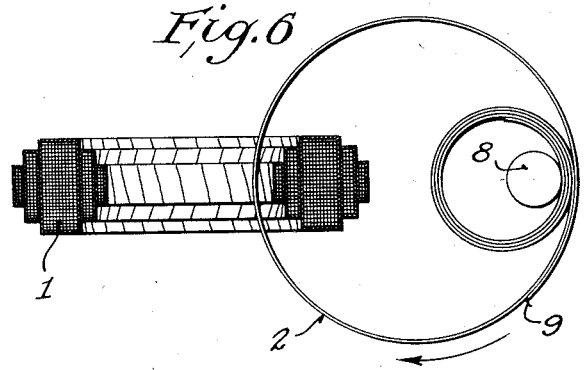
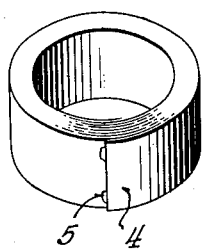
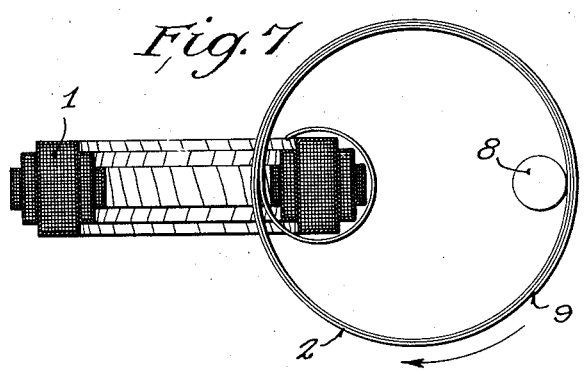
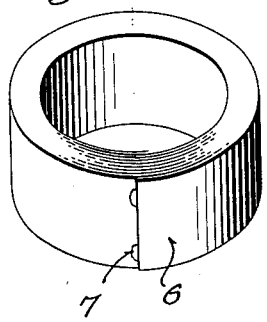
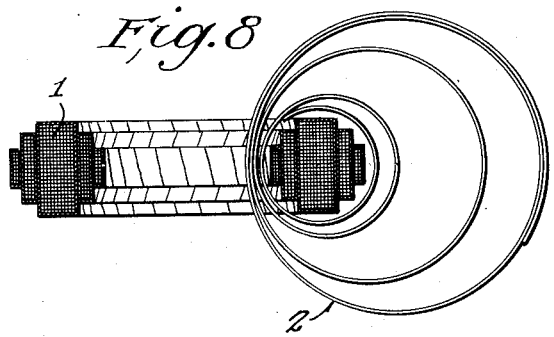
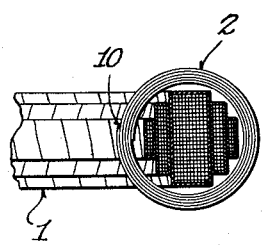
INVENTOR.
ALWIN G. STEINMAYER
BY
ATTORNEY.

Patented Mar. 14, 1944

2,344,006

UNITED STATES PATENT OFFICE 2,344,006

METHOD OF MAKING ELECTROMAGNETIC INDUCTION APPARATUS

Alwin G. Steinmayer, Milwaukee, Wis., assignor to Line Material Company, South Milwaukee, Wis., a corporation of Delaware Application January 25, 1941, Serial No. 375,908

11 Claims. (Cl. 29—155.5)

This invention relates to a method of making electromagnetic induction apparatus.

This invention is an improvement over that disclosed in the Granfield Patent No. 2,160,588 of May 30, 1939. In the Granfield patent a method and a resulting apparatus are shown whereby a rectangular preformed conductive winding is employed in conjunction with a wound magnetic core formed of ribbon of uniform width.

It is a well known fact that it is more difficult and more expensive to wind a rectangular conductive winding than a circular winding, and also it is a well known fact that the insulation tends to break or crack at the corners of a rectangular preformed coil often resulting in damage to the coil and in shortening the life of the resulting apparatus, and it is also well known that a circular coil has greater mechanical strength in resisting the severe stresses incident to short-circuit conditions.

This invention is designed to overcome the above noted defects incident to the use of a preformed rectangular winding, and this invention has for its object the use of a preformed circular winding which has maximum mechanical strength in resisting the sudden violent stresses due to accidental short-circuiting for instance, and which has marked freedom from cracking of the insulation or other damage to the wire, as there are no sharp corners around which the winding has to be formed, and which at the same time maintains a satisfactory space factor.

Further objects of this invention are to provide a method and apparatus in which a magnetic core is threaded through and wound within a preformed circular winding and in which this magnetic core is stepped so as to provide a cruciform shape to thereby markedly reduce the waste of space within the conductive winding and to lessen the amount of core material and also to reduce the length of conductive winding required.

Further objects are to provide a construction in which a stepped or rounded cross-sectional shape is imparted to the circular conductive winding which interlinks with the wound, stepped magnetic core so that the minimum amount of material for both the conductive winding and the magnetic core is required while maintaining a very high electrical efficiency for the apparatus and obtaining the maximum mechanical strength.

Further objects are to provide an apparatus and a method of producing the same in which no strains are left within the wound core when the device is completed, and in which no impairment of the magnetic characteristics of the wound core results from the method by which the apparatus is produced.

Further objects of this invention are to provide a method of winding a stepped or cruciform core of magnetic material within a preformed circular conductive winding, in which a predetermined width of strip is first wound in a compact form and annealed and is thereafter threaded through and wound into interlinking relation with the preformed circular conductive winding and subsequently compacted, and thereafter in which a second core is first wound in a compact form of greater internal diameter and annealed and is thereafter threaded through and wound on the previously wound core, the subsequently wound core section being thereafter compacted and these steps repeated until the proper size and shape of the stepped cruciform core is produced.

In this way this invention provides a method and a resulting electromagnetic induction apparatus in which strips of different widths are employed in forming the core and yet in which the core is wound into interlinking relation to a preformed circular conductive winding in such a manner that very little lost space results in the finished apparatus.

The accompanying drawings illustrate the invention.

Figure 1 is a view showing the conductive winding in section and the wound magnetic cores in elevation.

Figure 2 is a view in a plane substantially at right angles to that of Figure 1, showing the wound magnetic cores in section and the conductive winding in elevation.

Figure 3 is a view of the first section of one of the cores after it has been annealed.

Figures 4 and 5 are similar views of successive sections of the cores of progressively different widths showing the sections after they have been annealed.

Figure 6 shows the manner in which the first section of the core is wound into interlinking relation with the conductive preformed circular winding.

Figure 7 is a view showing the process at a further stage when all of the first section of the core has been unwound and interlinked with the conductive winding.

Figure 8 shows a further stage in the process in which the core is being compacted.

Figure 9 shows the first section of the core as it appears when this process is completely finished and when it is in its final position in interlinking relation with the conductive winding.

Figure 10 shows the next step in the process of winding a successive core section onto the previously compacted core section.

This invention is applicable to transformers, reactors or other electromagnetic induction apparatus.

In the drawings the invention has been shown as applied to a transformer. The first step in the production of the transformer is to form the circular conductive winding which is indicated generally by the reference character 1. The term "conductive winding" is intended to cover the primary and secondary structure or the winding for the reactor or similar device. The primary may be arranged centrally, if desired, with the secondary arranged internally and externally thereof as shown in Figure 1, or in any other suitable manner.

This winding structure is a circular form winding and is completely wound, taped or otherwise protected in accordance with the usual practice. It is preferable to form this winding stepped or rounded in cross-section so as to have a good space factor so far as the circular form winding itself is concerned.

In practicing this invention the good space factor is also obtained, so far as the core is concerned, by providing a stepped core construction whereby the core substantially fills the interior of the winding and the winding substantially fills the interior of the core, as is shown most clearly in the finished structure of Figures 1 and 2, Figure 1 being a transverse section showing the conductive winding in section and the core structure in elevation, Figure 2 being a view at right angles to Figure 1 showing the core structure in section and the conductive winding in elevation.

In practicing this invention either hot rolled or cold rolled magnetic sheet material in the form of a ribbon or strip is employed, or if desired, any other suitable material. However, it has been found that the cold rolled, high reduction magnetic strip is preferable.

The first step after forming the conductive winding, which is stepped or rounded in cross-section, is to wind a series of core sections shown in Figures 3, 4 and 5. These sections are formed of successively wider magnetic strip material. They are wound in a compact manner and are tack welded as indicated. For example, the smallest section of smallest width and smallest internal and external diameter is shown in Figure 3, the narrow magnetic ribbon or strip being indicated by the reference character 2. After the strip has been tightly wound, it is tack welded as indicated at 3 or otherwise secured in its compacted shape. Similarly the next wider magnetic strip indicated by the reference character 4 is wound in a compact roll as shown in Figure 4 and is tack welded or otherwise secured as indicated at 5. Similarly the next wider magnetic strip 6 is wound in a compact roll and is tack welded or otherwise secured as indicated at 7.

For the construction shown in the drawings, two such sets of compacted rolls of magnetic ribbon or strip are produced. These rolls are so made that the internal diameter of the next larger roll fits the external diameter of the next smaller roll.

After they have been wound in a compact manner, they are annealed, for example as set forth in the Granfield patent hereinabove referred to. Thereafter the smallest roll is mounted upon a roller or arbor 8 and the first turn of the loop of the strip 2 is unwound from the compacted roll and threaded through the conductive winding to form a large loop, as shown in Figure 6. The diameter of this loop is such that the loop will pass freely through the conductive winding and around the roll from which the loop is being drawn without damaging either the strip or the winding and particularly without exceeding the elastic limit of the annealed magnetic strip. During this unwinding operation, it is preferable when the first loop is formed, as shown in Figure 6, to tack weld the end of the loop as indicated at 9 and thereafter to continue unwinding from the compacted roll until all of the strip is unwound. Thereafter the arbor or pin 8 is removed and the weld 9 is broken.

The resiliency of the material tends to make it contract to the position shown in Figure 8. However, it is completely collapsed or contracted around the conductive winding by temporarily securing the inner end of the ribbon or strip 2 to the magnetic winding in any suitable manner, not shown, and thereafter compacting the coil to its initial dimensions as shown in Figure 9. Thereafter the outer end is again tack welded as indicated at 10 or otherwise secured.

The unwinding of the magnetic strip 2 from the roll is accomplished in exactly the same manner as that set forth in the above identified Granfield patent. The machine employed may be of the type shown in the Granfield Patent No. 2,160,589 of May 30, 1939, and this machine may be employed to unwind the roll shown in Figure 3 into a large loop interlinking the conductive winding as shown in Figure 7. Thereafter the magnetic coil may be compacted either by hand or by means of the machine of the Granfield patent hereinabove referred to. The use of the machine produces quicker results.

The next step in the process after the first magnetic core section has been compacted and secured in its compacted condition, as shown in Figure 9, is to proceed in identically the same manner with the next larger annealed coil of the core as shown in Figure 4. This magnetic ribbon or strip is threaded through the conductive winding 1 and around the previously compacted strip 2. The large loop is formed as indicated in Figure 10 and the end of the strip is tack welded as indicated at 11 in Figure 10. Thereafter this tack weld is broken after the strip 4 has been completely unwound and the strip is compacted to its initial size as shown in Figure 4. This compacts the second strip on to the first strip. Thereafter the same process is followed for the next succeeding larger magnetic strip or ribbon 6 as shown in Figure 5. Any number of sections of core can be employed as may be required. In the form of the invention shown in Figures 1 and 2, this entire process is repeated for forming the second portion of the core structure as there are similar portions of the core structure each of which interlinks with the conductive winding as shown in Figures 1 and 2.

It is to be noted particularly that at no time in the unwinding process is the elastic limit exceeded and when the wound ribbon is finally compacted to its initial size, all strains disappear and there is thus no damage done to the magnetic qualities of the material.

It is to be noted particularly that this invention provides a structure in which a stepped core results and in which this stepped core is formed in interlinking relation with a circular conductive winding. This is not possible with a form wound circular winding where a single width of core is employed for the space factor would be so poor that the device would be highly inefficient in use and also an excessive amount of material, both for the conductive winding and the core structure, would be required.

It would be impractical to weld the successive widths of magnetic strip together in one continuous length and wind them in interlinking relation with the conductive winding as one complete operation and thereafter collapse them all as one complete operation. There would be no way of maintaining the relative position of the successive widths of magnetic ribbon structure which go to make up the magnetic core. However, by practicing the invention as outlined hereinabove, it is a relatively simple matter to unwind and simultaneously rewind one width of magnetic core material into interlinking relation with the conductive winding and thereafter completely compact and secure this section of the magnetic core against unwinding before any operation is performed upon the next succeeding width of magnetic strip or ribbon. In this manner each section is correctly placed in its relative position with respect to the conductive winding and with respect to the preceding core section, and there is no chance of the parts becoming misplaced or deranged during the compacting of the succeeding widths of materials to form the core structure.

It is to be noted particularly that this invention enables the maximum benefit to be taken of the advantages of a preformed circular stepped or cross-sectionally rounded winding and a stepped conductive magnetic core, so that there is the maximum use of all of the space available within the conductive winding on the one hand, and within the magnetic core structure on the other hand, as is evident from an examination of Figures 1 and 2.

It is preferable to at least temporarily secure the inner end of each succeeding section of the magnetic core to the preceding compacted core prior to compacting as this will prevent the entire series of convolutions from idly slipping around the previously compacted section.

All of the advantages inherent in the use of a circular conductive winding are obtained by this invention, including the relative freedom from danger of cracking the insulation on the conductor or damage of the conductor itself due to the fact that there are no sharp corners around which the conductor has to be sharply bent, as is the case where a rectangular preformed conductive winding is employed. Also there is the mechanical strength which results from the use of a circular conductive winding so that the winding has maximum strength in resisting the high stresses incident to accidental short-circuit conditions.

Any adhesions that may have occurred between successive convolutions during heat treatment are broken during the unwinding and simultaneous rewinding process for each of the core sections, thus minimizing losses due to eddy currents. Further, it is to be noted that full advantage is taken of the favorable magnetic orientation of the grain of the magnetic ribbon as the flux is caused to travel lengthwise of the ribbon. Further, it is to be noted that the air gap reluctance is enormously reduced due to the flat overlapping of successive convolutions.

Further it is apparent that by the practice of this invention a stepped magnetic core structure can be formed with the minimum amount of material both for the conductive winding and for the core section itself and with the shortest possible magnetic paths and with the maximum use of the space within the circular stepped or cross-sectionally rounded conductive winding and the circular stepped wound core structure.

All of the above features contribute to a high degree of mechanical strength for the device and also contribute markedly to a high electrical efficiency and freedom from danger due to break down through damage to insulation, as has been developed hereinabove.

Further, it is obvious that the process can be repeatedly carried out for each section of the core by using the same general type of machine as that disclosed in the above noted Granfield patents with the assurance, however, that the stepped magnetic core structure will retain its correct relative position in the final product.

Although this invention has been described in considerable detail, it is to be understood that such description is intended as illustrative rather than limiting, as the invention may be variously embodied and is to be interpreted as claimed.

I claim:

1. The method of producing an assembled magnetic core and winding, said method including the steps of winding a conductive winding, winding a strip of magnetic sheet material into a coil, passing the outer end of said coil through the conductive winding and securing it to the outer surface of the coil to form a loop interlinking with the winding, rotating the coil to unwind it and simultaneously rewind it in interlinking relation with the conductive winding, releasing the secured outer end and compacting the coil in interlinking relation with the conductive winding and securing the coil in its compacted form against unwinding, winding a second strip of magnetic sheet material of a different width from that of the first mentioned strip to form a second coil, passing the outer end of said second coil through the conductive winding and around the first compacted coil and securing it to the outer surface of said second coil to form a loop around the first compacted coil and in interlinking relation with said conductive winding, rotating the second coil to unwind it and simultaneously rewind it in interlinking relation with the conductve winding and around the first compacted coil, releasing the secured outer end of said second coil and compacting the second coil around the first compacted coil.

2. The method of producing an assembled magnetic core and winding, said method including the steps of winding a conductive winding, winding a strip of magnetic sheet material into a coil, passing the outer end of said coil through the conductive winding to form a loop interlinking with said conductive winding, rotating the coil to unwind it and simultaneously rewind it in interlinking relation with the conductive winding, compacting the coil in interlinking relation with said conductive winding, winding a second strip of magnetic sheet material of a different width from that of the first mentioned strip to form a second coil, passing the outer end of said second coil through the conductive winding and around the first compacted coil to form a loop interlinking with said conductive winding and around said compacted coil, rotating the second coil to unwind it and simultaneously rewind it into interlinking relation with the conductive winding and around said first compacted coil, and compacting the second coil around the first compacted coil.

3. The method of producing an assembled magnetic core and winding, said method including the steps of winding a circular conductive winding, winding a strip of magnetic sheet material into a coil, passing the outer end of said coil through the circular conductive winding to form a loop interlinking with the winding, rotating the coil to unwind it and simultaneously rewind it in interlinking relation with the circular conductive winding, compacting the coil in interlinking relation with the circular conductive winding, winding a second strip of magnetic sheet material of a greater width than that of the first mentioned strip to form a second coil, passing the outer end of said second coil through the circular conductive winding and around the first compacted coil to form a loop around the first compacted coil and in interlinking relation with said circular conductive winding, rotating the second coil to unwind it and simultaneously rewind it in interlinking relation with the circular conductive winding and around the first compacted coil, and compacting the second coil around the first compacted coil.

4. The method of producing an assembled magnetic core and winding, said method including the steps of winding a circular conductive winding, winding a strip of magnetic sheet material into a coil, passing the outer end of said coil through the circular conductive winding to form a loop interlinking with the winding, rotating the coil to unwind it and simultaneously rewind it in interlinking relation with the circular conductive winding, compacting the coil in interlinking relation with the circular conductive winding, winding a series of strips of successively increasing widths of magnetic sheet material to form a series of coils, and successively repeating the steps of passing the outer end of the next coil having the next wider strip through the circular conductive winding and around the preceding coil to form a loop in interlinking relation with the circular conductive winding and around the preceding compacted coil, rotating the successive coil to unwind it and simultaneously rewind it in interlinking relation with the circular conductive winding and around the preceding compacted coil, and compacting the succeeding coil around the preceding previously compacted coil.

5. The method of producing an assembled magnetic core and winding, said method comprising the steps of form winding a circular conductive winding, winding a series of coils of successively increasing internal diameters of strips of magnetic sheet material of successively increasing widths, simultaneously unwinding and rewinding the coil of smallest width and smallest diameter in interlinking relation with said circular conductive winding into a loop large enough to avoid binding on the winding sufficient to damage the winding or the strip, and then collapsing said loop upon the winding so that the collapsed coil will have substantially the same size as the original coil and will have the turns in the same sequence, and subsequently successively unwinding and simultaneously rewinding the next wider coil upon the preceding collapsed coil to form a loop large enough to freely pass around the previously collapsed coil, and thereafter collapsing the loop thus formed so that each successive coil will be of substantially its original size and will have the turns in the same sequence.

6. The method of producing an assembled magnetic core and winding, said method comprising the steps of form winding a circular conductive winding approximating a circle in cross-section, winding a series of coils of successively increasing internal diameters of strips of magnetic sheet material of successively increasing widths, simultaneously unwinding and rewinding the coil of smallest width and smallest diameter in interlinking relation with said circular conductive winding into a loop large enough to avoid binding on the winding sufficient to damage the winding or the strip, and then collapsing said loop upon the winding so that the collapsed coil will have substantially the same size as the original coil and will have the turns in the same sequence, and subsequently successively unwinding and simultaneously rewinding the next wider coil upon the preceding collapsed coil to form a loop large enough to freely pass around the previously collapsed coil, and thereafter collapsing the loop thus formed so that each successive coil will be of substantially its original size and will have the turns in the same sequence.

7. The method of producing an assembled magnetic core and winding, said method comprising the steps of form winding a circular conductive winding, winding a series of coils of different internal diameters and of different widths from strips of magnetic sheet material, simultaneously unwinding and rewinding a coil of smallest width and smallest diameter into interlinking relation with said circular conductive winding into a loop large enough to avoid binding on the winding sufficient to damage the winding or the strip, and then collapsing said loop upon the winding so that the collapsed coil will have substantially the same size as the original coil and will have the turns in the same sequence, and subsequently successively unwinding and simultaneously rewinding successive coils of different widths upon the collapsed coil to form a loop, and thereafter collapsing the loop to form a magnetic core of cruciform cross-section substantially filling the window through the circular conductive winding.

8. The method of producing an assembled magnetic core and winding, said method comprising the steps of form winding a circular conductive winding, forming two diametrically opposed magnetic structures interlinking said conductive winding, each magnetic structure being produced by the method of winding a series of coils of successively increasing internal diameters of strips of magnetic sheet material of successively increasing widths, simultaneously unwinding and rewinding the coil of smallest width and smallest diameter into interlinking relation with the circular conductive winding into a loop large enough to avoid binding on the winding sufficient to damage the winding or the strip, and then collapsing said loop upon the winding so that the collapsed coil will have substantially the same size as the original coil and will have the turns in the same sequence, and subsequently successively unwinding and simultaneously rewinding the next wider coil upon the preceding collapsed coil to form a loop large enough to freely pass around the previously collapsed coil, and thereafter collapsing the loop thus formed so that each successive coil will be of substantially its original size and will have the turns in the same sequence.

9. The method of making an electromagnetic induction apparatus comprising forming a preformed circular conductive winding, winding a first section of a core from a ribbon of magnetic material, annealing the first section while it is held in its wound form, unwinding and simultaneously rewinding the first section of the core into interlinking relation with the preformed circular conductive winding, compacting the first section to substantially its initial dimensions, securing the first section against unwinding, winding at least a second section of core to a compact form from a ribbon of magnetic material of different width from that of said first mentioned ribbon, annealing said second section while in its compacted wound form, unwinding and simultaneously rewinding the second section onto said first section into interlinking relation with said conductive winding, and compacting said second section to substantially its initial dimensions and onto said first compacted section.

10. The method of making an electromagnetic induction apparatus comprising forming a preformed circular conductive winding, winding a strip of magnetic sheet material into a coil, annealing the wound coil while it is held in its wound form, passing the outer end of the annealed coil through the conductive circular winding to form a loop interlinking with the winding without exceeding the elastic limit of the annealed strip of magnetic sheet material, rotating the coil to unwind it and simultaneously rewind it in interlinking relation with the circular conductive winding, compacting the coil in interlinking relation with the circular conductive winding, winding a second strip of magnetic sheet material of a different width from that of the first mentioned strip to form a second coil of larger internal diameter, annealing the wound second coil while it is held in its wound form, passing the outer end of the second coil through the circular conductive winding and around the first compacted coil to form a loop around the first compacted coil and in interlinking relation with said winding without exceeding the elastic limit of the annealed magnetic strip of the second coil, rotating the second coil to unwind it and simultaneously rewind it in interlinking relation with the circular conductive winding and around said first compacted coil, and compacting the second coil around the first compacted coil.

11. The method of assembling a magnetic core and a conductive winding, said method comprising the winding of a conductive coil in stepped circular sections of different widths and disposing the sections interiorly and exteriorly of the widest section in successive steps to form a conductive winding approximately circular in cross-section, and thereafter forming two diametrically opposed magnetic structures interlinking said conductive winding, each magnetic structure being produced by the method of winding a series of coils of successively increasing internal diameters of strips of magnetic sheet material of successively increasing widths and completely finishing the winding of each coil in interlinking relation with the conductive winding before beginning the winding of the next succeeding coil of greater width.

ALWIN G. STEINMAYER.